US005215124A

United States Patent [19]

Hattori et al.

[11] Patent Number: 5,215,124

[45] Date of Patent: Jun. 1, 1993

[54] ACCUMULATOR

[75] Inventors: Kenji Hattori; Yoshitaka Miyakawa; Teruo Akema; Makoto Ida, all of Saitama, Japan

[73] Assignee: Honda Giken Kogyo Kabushiki Kaisha, Tokyo, Japan

[21] Appl. No.: 779,788

[22] Filed: Oct. 21, 1991

[30] Foreign Application Priority Data

Oct. 23, 1990 [JP] Japan ..... 2-110714
Oct. 23, 1990 [JP] Japan ..... 2-110797
Oct. 23, 1990 [JP] Japan ..... 2-285655

[51] Int. Cl.[5] ..... F16L 55/04

[52] U.S. Cl. ..... 138/30; 138/26; 417/540

[58] Field of Search ..... 138/26, 30; 220/530; 417/540

[56] References Cited

U.S. PATENT DOCUMENTS

| | | | |
|---|---|---|---|
| 3,275,410 | 9/1966 | Nee | 220/530 |
| 3,442,293 | 5/1969 | Erdmann | 138/30 |
| 4,777,983 | 10/1988 | Steveley | 138/30 |
| 4,821,777 | 8/1989 | Martin | 138/30 |
| 5,027,860 | 7/1991 | Tuthill | 138/30 |
| 5,036,110 | 7/1991 | Moureaux | 521/137 |
| 5,054,373 | 10/1991 | Brault et al. | 138/30 |
| 5,117,873 | 6/1992 | Miyakawa et al. | 138/30 |

FOREIGN PATENT DOCUMENTS

| | | | |
|---|---|---|---|
| 0360648 | 3/1990 | European Pat. Off. . | |
| 0376058 | 7/1990 | European Pat. Off. . | |
| 3903644 | 8/1990 | Fed. Rep. of Germany | 220/530 |
| 2603075 | 2/1988 | France . | |
| 2640018 | 6/1990 | France . | |

OTHER PUBLICATIONS

Patent Abstracts of Japan, vol. 10, No. 372 (M-544) [2429], Dec. 11, 1986, of JP 61-165002, Jul. 25, 1986.

*Primary Examiner*—James E. Bryant, III
*Attorney, Agent, or Firm*—Armstrong, Westerman, Hattori, McLeland & Naughton

[57] ABSTRACT

In an accumulator in which a peripheral edge of a bladder dividing the interior of a shell into a gas chamber and a liquid chamber is attached to the shell, the radius of curvature of an inner wall of the shell defining the gas chamber is larger than that of an inner wall of the shell defining the liquid chamber. This construction ensures that the diameter of the bladder can be relatively increased, the deflection of the bladder with a variation in pressure in the gas chamber and in the liquid chamber can be increased, and the radius of curvature of a curved portion of the peripheral edge of the bladder can be increased, there by contributing to an overall improvement in the durability of the bladder.

15 Claims, 4 Drawing Sheets

ACCUMULATOR

BACKGROUND OF THE INVENTION

1. Field of the Invention

The present invention relates to accumulators having a shell and a bladder dividing the interior of the shell into a liquid chamber and a gas chamber, the peripheral edge of the bladder being attached to the shell.

2. Description of the Prior Art

Such an accumulator has been conventionally known, for example, from Japanese Laid-Open Utility Model Application No. 168001/89. In this accumulator, the radii of curvature of an inner wall of the shell facing toward the gas chamber and an inner wall facing toward the liquid chamber are substantially the same, and thus the shell as a whole is spherical.

In such an accumulator, the volume of the gas chamber and the volume of the liquid chamber have a close relationship with the size (diameter) of the bladder, and since the diameter of the bladder is determined by the volumes of the gas chamber and the liquid chamber, the diameter is difficult to increase. Therefore, in such an accumulator, since the diameter of the bladder relative to the internal volume of the shell is relatively small and the deflection of the bladder with a variation in pressure in the gas chamber, i.e., a variation in volume, is relatively large, and since the radius of curvature of the curved portion of the peripheral edge of the bladder is also small, a problem of durability for the bladder results.

When the bladder is formed by a lamination of a bladder body made of a rubber and a gas impervious member formed from a material different in elongation from the bladder body such as in the accumulator disclosed in Japanese Laid-Open Utility Model Application No. 168001/89, the durability of the bladder is largely governed by the amount of deflection and hence, the above durability problem is significant.

In accumulators used in anti-lock brake control devices for automobiles, hydraulic boosting devices for brake devices, and traction control devices for an automobile by use of a brake, the bladder divides the interior of the shell into a liquid chamber for accumulating a working liquid such as a brake fluid and a gas chamber. In order to prevent gas from permeating into the liquid chamber from the gas chamber, the bladder includes a member formed from a laminated fabric material which is affixed to at least one surface of a thin sheet element of metal or resinous material having a small gas-permeability, the member being embedded in a bladder body made of an elastomer, or alternatively, the member is affixed to one surface of the bladder body. With such a construction for the bladder, the permeation of gas is inhibited by the thin sheet element of the metal or resinous material, and the strength of the thin sheet element is reinforced by the laminated fabric material.

However, a thin sheet element made of metal has extremely low values of elongation and flexibility and hence, fatigue induced due to the repeated displacement of the bladder in response to an increase and decrease in brake fluid pressure in the liquid chamber is quite likely. The spread of fatigue type cracks can be inhibited by the laminated fabric material, but it is difficult to positively prevent gas permeation through the bladder.

In addition, in the above-mentioned prior art, the resinous material of the thin sheet element is polyvinylidene fluoride or chloride and an element of such a resinous material has low elongation at a low temperatures. Hence, it is difficult to positively prevent the generation of cracks due to repeated displacement of the bladder. The polyvinylidene fluoride or chloride has a high resistance to solvents and therefore it is difficult to improve the cold temperature resistance of the material by the addition of a plasticizer.

Moreover, the elongation of the laminated fabric material is extremely small and hence, the displacement of the bladder is restrained by the laminated fabric material. As a result, the accumulating capacity of the accumulator is necessarily reduced.

It has been found that to solve such a problem, a material exhibiting a large elongation at low temperatures may be used to inhibit the gas permeation. For example, if the gas-impervious member is formed from a polyvinyl alcohol which contains glycerine, the above requirement can be met. However, when the subject working liquid contains an ethylene glycol alkyl ether or the like such as a brake fluid and if a gas-impervious member is formed using only the polyvinyl alcohol which contains glycerine as described above, the gas impervious member becomes hardened and tends to crack particularly at low temperatures since the immersion of the member in the working liquid results in the extraction of the glycerine from the member.

Further, in the above-mentioned prior art, the gas-impervious member is formed by affixing a second membrane of laminated fabric material to at least one surface of a first membrane composed of a single layer of a synthetic resin, the first membrane having a greater elongation than the second membrane. Therefore, since the repeated displacement of the bladder causes relatively large shearing forces to act on the adhered surfaces of the first and second membranes, delamination of the adhered surfaces occurs resulting in an increased gas-permeability.

SUMMARY OF THE INVENTION

Accordingly, it is an object of the present invention to provide an accumulator which has excellent durability.

To achieve the first object, according to the present invention, there is provided an accumulator comprising a hollow shell, a bladder dividing the interior of the shell into a gas chamber and a liquid chamber by the peripheral edge of the bladder being attached to the shell, the radius of curvature of an inner wall of the shell defining the gas chamber being larger than the radius of an inner wall of the shell defining the liquid chamber.

Such a construction for an accumulator, as compared to a construction according to the prior art having the same internal volume for the shell, enables the diameter of the bladder to be increased. In addition, the amount of bladder deflection with a variation in pressure in the gas chamber and in the liquid chamber can be relatively decreased, and the radius of curvature of the curved portion of the peripheral edge of the bladder can be increased, thereby contributing to a marked improvement in the durability of the bladder.

In addition, if the shell of the accumulator is formed by drawing a flat plate, the radius of curvature of each of the shell inner walls or surfaces defining the gas and liquid chambers is larger than that of a compleletly spherical shell having the same volume. Therefore, it is possible to facilitate the formation of the shell by reducing the amount of plastic deformation to be accomplished by the drawing procedure.

It is also a second object of the present invention to provide an accumulator wherein the permeation of gas can be reliably prevented while avoiding the immersion of a bladder into a working liquid, and moreover, the accumulating capacity can be relatively increased.

To achieve the above second object according to the present invention, there is provided an accumulator in which a peripheral edge of a bladder is attached to the shell and divides the interior of the shell into a liquid chamber for accumulating a working liquid such as a brake fluid containing an ethylene glycol alkyl ether or the like, which is called Non-petroleum base brake fluid in JIS, ISO, and so on, and a gas chamber, wherein the bladder comprises a bladder body made of elastic material and supported at its peripheral edge on the shell, and a gas-impervious member including a lamination of a second membrane of an ethylene-vinyl alcohol copolymer to a first membrane of a polyvinyl alcohol which contains glycerine on at least one surface of the first membrane which is adjacent to the liquid chamber, the gas-impervious member being provided on the bladder body such that at least a peripheral edge of the gas-impervious member is supported on the shell together with the bladder body.

With the above construction, the first membrane is of polyvinyl alcohol which contains glycerine and therefore, has a relatively large elongation down to a low temperature, thereby ensuring that the generation of cracks can be avoided so as to prevent the permeation of the gas contained in the gas chamber. In addition, the second membrane laminated on the surface of the first membrane adjacent or closer to the liquid chamber is of a ethylene-vinyl alcohol copolymer. Therefore, it is possible to protect the first membrane against contact with the working liquid such as a brake fluid containing an ethylene glycol alkyl ether or the like which is contained in the liquid chamber. Moreover, the elongation of the second membrane is large enough to avoid the generation of cracks due to the displacement of the bladder, and is smaller than that of the first membrane. As a consequence, the second membrane functions so as to reinforce the strength of the first membrane. The elongation of the gas-impervious member is also relatively large and therefore, it is possible to provide a relatively increased amount of displacement for the bladder and thus a relatively increased accumulating capacity for the accumulator.

Further, it is a third object of the present invention to provide an accumulator wherein shearing forces acting on the adhered surfaces of first and second membranes can be suppressed to a low level, thereby preventing peeling-off or delamination of the adhered surfaces.

To achieve the third object according to the present invention, there is provided an accumulator wherein a peripheral edge of a bladder is attached to the shell and the bladder divides the shell interior into a liquid chamber and a gas chamber, the bladder comprising a bladder body of elastic material and a gas-impervious member on the bladder body which is comprised of a first membrane including a lamination of a plurality of thin films of a synthetic resin having a low gas-permeability, and a second membrane of a material having an smaller elongation than that of the first membrane and laminated onto at least one surface of the first membrane.

Such construction for an accumulator ensures that deformation in a shearing direction in a boundary region of adjacent films in the laminate of a plurality of thin films constituting the first membrane is acceptable. Therefore, it is possible to suppress shearing forces on the adhered surfaces of the first and second membranes to a low level.

The above and other objects, features and advantages of the invention will become apparent from a consideration of the following description of the preferred embodiments, taken in conjunction with the accompanying drawings.

BRIEF DESCRIPTION OF THE DRAWINGS

FIGS. 1 to 3*d* illustrate a preferred embodiment of an accumulator according to the present invention, wherein FIG. 1 is a longitudinal sectional view of the accumulator;

FIG. 2 is a view of the encircled portion indicated by numeral II in FIG. I on an enlarged scale;

FIGS. 3*a* to 3*d* are views which sequentially illustrate a process for making the accumulator.

DESCRIPTION OF THE PREFERRED EMBODIMENTS

The present invention will now be described by way of preferred embodiments in connection with the accompanying drawings.

Referring first to FIG. which illustrates a preferred embodiment of the present invention, shown is an accumulator A which may be used in an anti-lock brake control device for an automobile, a hydraulic boosting device for a brake device, and a traction control device for an automobile by use of a brake. Accumulator A comprises a shell I whose interior is divided by a bladder 2 which has a peripheral edge supported on an inner surface of the shell 1. The bladder 2 divides the shell 1 into a gas chamber 3 into which a gas such as $N_2$ gas is sealingly charged, and a liquid chamber 4 for accumulating a brake fluid which contains ethylene glycol alkyl ether or the like.

Figure 1:
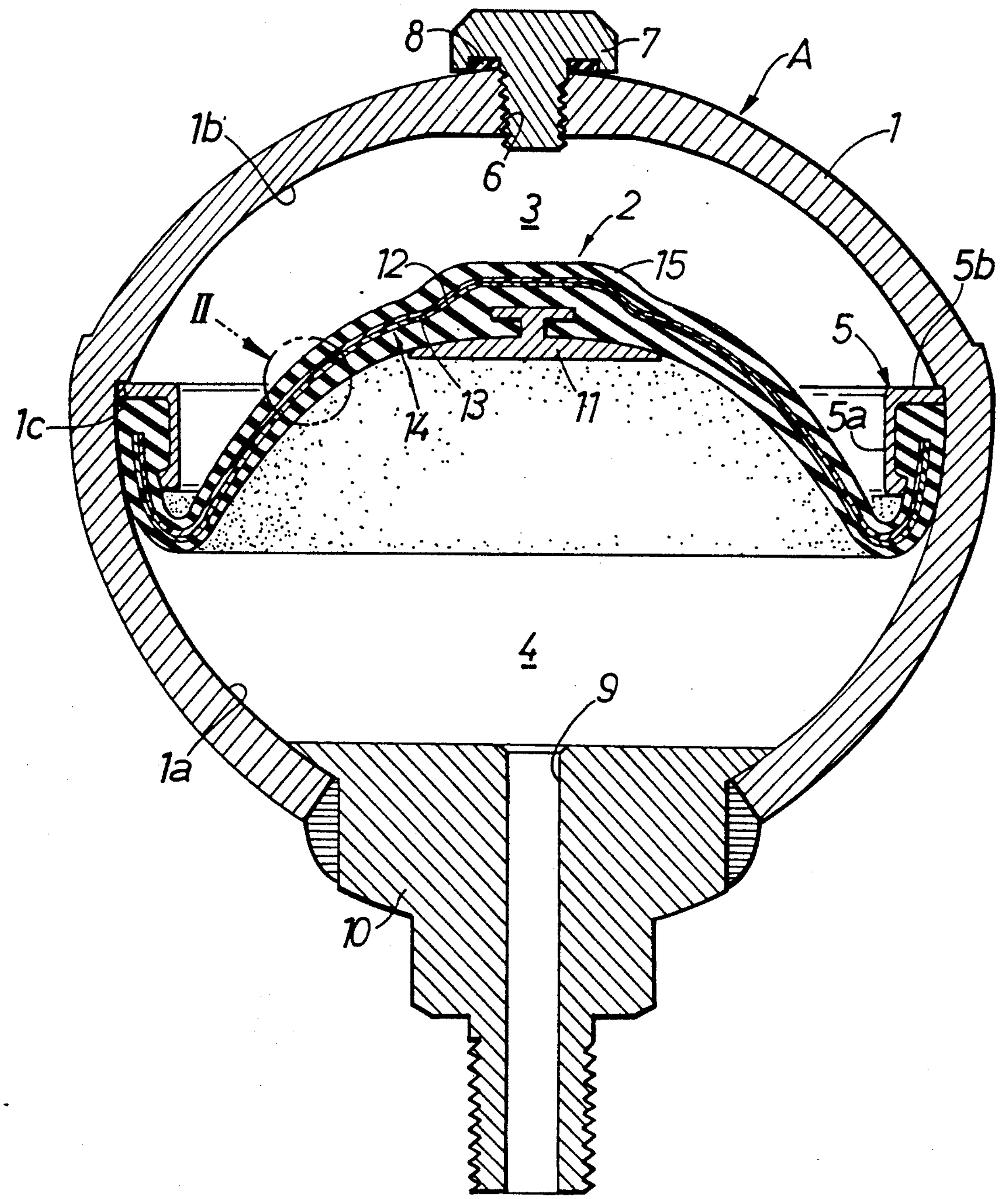

The peripheral edge of the bladder 2 is clamped between the inner surface of the shell 1 and a support member 5 fixed to the shell inner surface. As viewed in FIG. I, a hole 6 is provided in the top of the shell 1 for charging the gas into the gas chamber 3. Hole 6 is closed by a plug 7 fitted therein, and an 0-ring 8 is interposed between an outer surface of the shell 1 and the plug 7 about the hole 6. A plug member 10 is secured to a bottom of the shell 1 by welding as shown in FIG. 1 and has a connecting hole 9 leading to the liquid chamber 4. A brake fluid passage (not shown) is adapted to be connected to the connecting hole 9 of member 10. Moreover, a poppet 11 mounted to the central portion of the bladder 2 prevents the bladder from occluding or blocking the connecting hole 9 when the bladder 2 is deflected downwardly into the liquid chamber 4. More specifically, for example, a cross-shaped groove (not shown) may be provided on at least one of the contact surfaces of the poppet and an opened end of the connecting hole 9 so as to permit flow of the braking liquid therethrough when the poppet 11 is in contact with the opened end of the connecting hole 9.

The shell 1 is formed with a flattened top portion when viewed in vertical cross-section, with its inner surface 1*a* which faces toward the liquid chamber 4 being shaped spherically and with its inner surface 1*b* which faces toward the gas chamber 3 also being shaped spherically, the radius of curvature of the inner surface 1*b* being larger than that of the inner surface 1*a*. A step 1*c* is provided at the junction of the inner surfaces 1*a* and 1*b* which faces towards the liquid chamber 4. The support member 5 for engaging bladder 2 comprises a flange portion 5*b* provided at one end of a cylindrical portion 5*a* and is fixed to the shell 1 by being press-fit to the inner surface 1*a* such that the flange portion 5*b* is locked to the step 1*c*. The peripheral edge of the bladder 2 is clamped between the cylindrical portion 5*a* of the support member 5 and the inner surface 1*a*.

Figure 2:
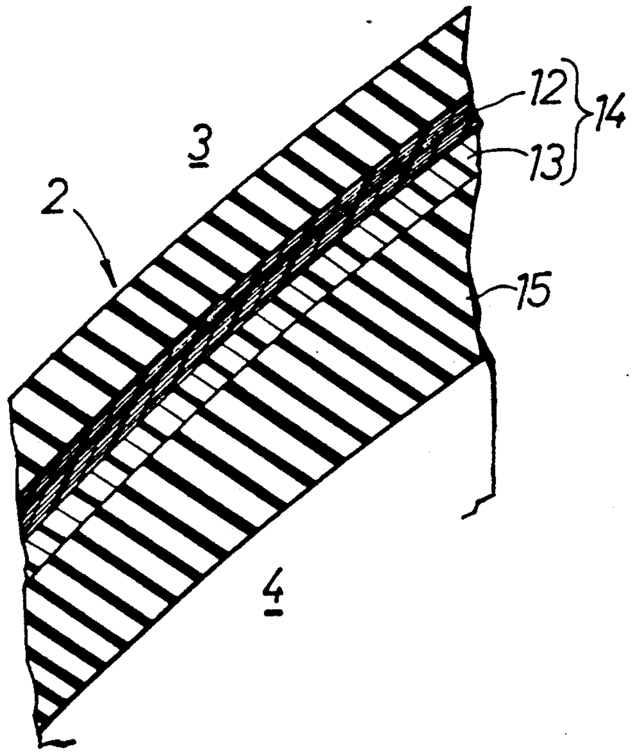

Referring now to FIG. 2, the bladder 2 comprises a gas-impervious member 14 provided in a bladder body 15 such that at least the peripheral edge of the member is supported in the shell 1 together with the peripheral edge of the bladder body 15. The gas-impervious member 14 of bladder 2 shows a lower perviousness to the flow of gas through the member than the bladder body 15 of an elastic material in the meaning of the term "gas-impervious". The member 14 comprises a first membrane 12 of a polyvinyl alcohol copolymer. The second membrane 13 is affixed to a surface of the first membrane 12 facing towards the liquid chamber 4. The first membrane 12 and the second membrane 13 are, for example, embedded into the bladder body 15 formed from an elastic material such as a butyl rubber.

Moreover, the first membrane 12 is formed by laminating a plurality of thin films of polyvinyl alcohol which contains glycerine in an amount of, for example, about 40% after being coated with water, so that the boundaries of the thin films are dissolved and adhered to each other.

The bladder 2 is formed so as to have a surface area substantially equal to that of the inner surface 1*a* of the shell 1. In addition, the bladder 2 has a shape such that little or no deflection is produced when subjected to conditions of the highest pressure (in a pressure region predetermined on the side of an associated hydraulic device obtained at a low temperature), that is, when the volume of the gas chamber 3 is minimized to displace the bladder 2 toward the gas chamber 3 to the maximum (in a condition of a full load).

Figure 3A:
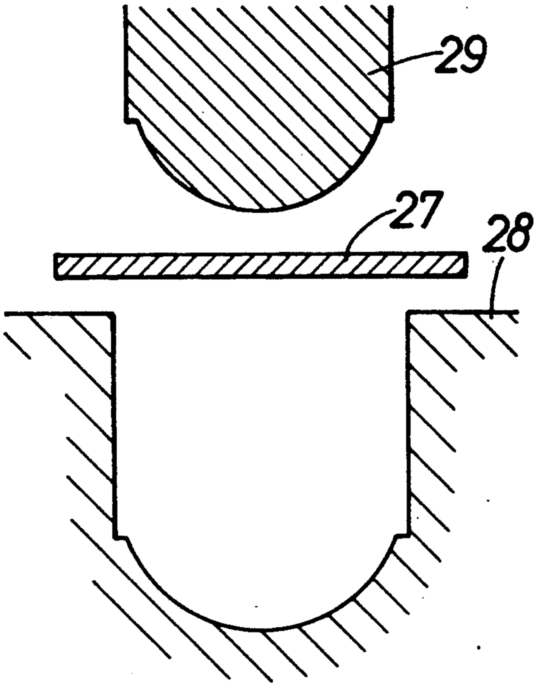
Figure 3B:
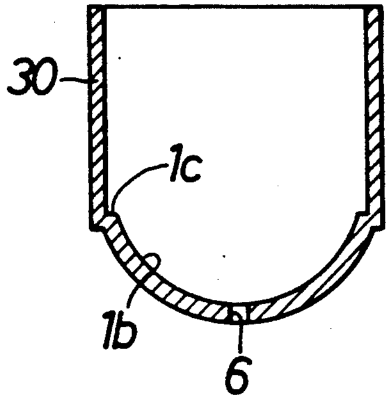

A process for making accumulator A will now be described with reference to FIGS. 3*a* to 3*d*. First, a disk 27 of suitable material is provided as shown in FIG. 3*a* and then drawn by dies 28 and 29, thereby forming a bottomed cylindrical member 30 as shown in FIG. 3*b* (step I). The cylindrical member 30 has a bottom which is semi-spherical with a relatively large radius of curvature such that its inner surface becomes the inner surface 1*b* of the shell 1. During step 1, because the radius of curvature required in such a drawing procedure is relatively large, a large capability for the press machine is not required and the amount of material plastically deformed is small, thereby leading to an improved workability.

Figure 3C:
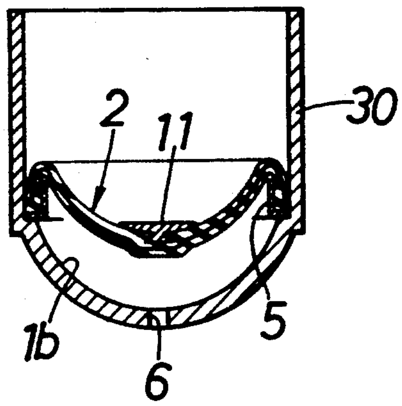
Figure 3D:
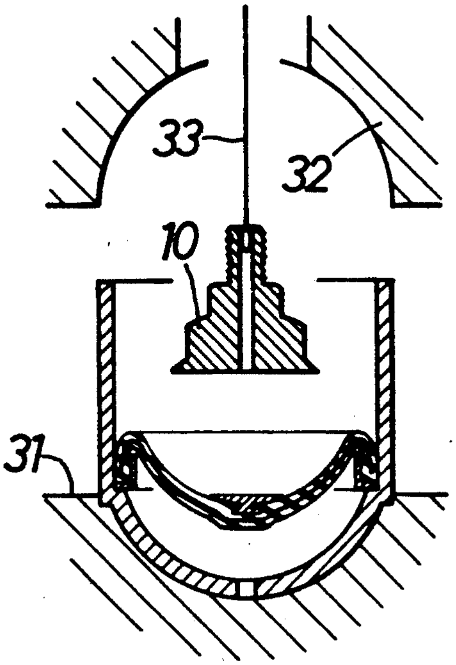

Then, the bottom of the member 30 is perforated to provide the hole 6, and, as shown in FIG. 3*c*, the bladder 2 is mounted in the member 30 (step II). Thereafter, as shown in FIG. 3*d*, the member 30 is retained on a die 31, and with the plug member 10 suspended by a wire 33 and disposed within the member 30, a die 32 is lowered to draw the open end of the member 30 (step III). This drawing procedure causes the open end of the member 30 to be reduced in diameter and fit over the plug member 10, thereby forming the inner surface 1*a* of the shell 1 (see FIG. 1). Even at this step III, a remedy for wrinkles or the like is uncomplicated since the radius of curvature produced in the drawing procedure is larger than that in the prior art. Thereafter, the plug member 10 is welded and thereby fixed to the shell 1 completing the process for making the accumulator A.

The operation of this embodiment of the accumulator will be described below. The shell I is formed with a flattened top portion when viewed in vertical cross-section, with its inner surface 1*a* facing toward the liquid chamber 4 being shaped spherically and with its inner surface 1*b* facing towards the gas chamber 3 being shaped spherically with a radius of curvature larger than that of the inner surface 1*a*. The peripheral edge of the bladder 2 is clamped between the shell 1 and the support member 5 locked and fixed to the step 1*c* provided between the inner surfaces 1*a* and 1*b* of the shell. For this reason, the bladder 2 can be formed to have a large diameter without exerting an influence on the volume of the gas chamber 3 nor on the volume of the liquid chamber 4, i.e., with the chambers each maintained at a defined volume. Therefore, it is possible to reduce the deflection of the bladder 2 as a result of a variation in pressure in the liquid chamber 4 and to provide a relatively large radius of curvature for a curved portion of the peripheral edge of the bladder resulting in a reduction in the stresses produced in the bladder and an improved fatigue resistance, i.e., an improved durability, for the bladder.

Moreover, the bladder 2 is formed such that no deflection is produced under a condition of full load, so that even if the pressure in the liquid chamber 4 varies, stress is merely produced in the bladder 2 in only one direction. More specifically, the bladder 2 is formed to have an initial shape deflecting or projecting toward the gas chamber 3 to the maximum at the time of use. Thus, even if the pressure in the liquid chamber 4 is varied, a deflection occurs only in one direction toward the liquid chamber 4 on the basis of such initial shape, and thus stresses produced in the bladder 2 are also in one direction. Therefore, it is possible to increase the fatigue limit of the bladder 2 to a higher level and therefore provide a high durability for the bladder.

In addition, since the surface area of the bladder 2 is substantially equal to that of the inner surface 1*a* in the shell I when no pressure is present in the liquid chamber 4, the bladder 2 comes into close contact with the inner surface 1*a* under the influence of a pressure within the gas chamber 3. Therefore, it is possible to restrain the maximum value of stress produced in the bladder 2 by support thereof with inner surface 1*a* and to further improve the durability of the bladder 2.

Further, in the bladder 2, the first membrane 12 of polyvinyl alcohol which contains glycerine inhibits the permeation of a gas and exhibits a large elongation even at a low temperature. Therefore, even if the displacement of the bladder 2 is repeated, cracks are not produced, and it is thereby possible to prevent to the utmost the permeation of the gas from the gas chamber into the liquid chamber 4. Moreover, the second membrane 13 of ethylene-vinyl alcohol copolymer cannot be immersed into and damaged by brake fluid containing ethylene glycol alkyl ether or the like. By affixing the second membrane 13 to the surface of the first membrane 12 closer to the liquid chamber 4, it can be ensured that the first membrane 12 which is liable to be damaged by the brake fluid is protected from contact with the brake fluid, and thus cracks can be reliably prevented from being produced in the first membrane due to immersion of the first membrane into the brake fluid which would cause glycerin to be extracted.

Additionally, the first membrane 12 of polyvinyl alcohol which contains glycerine is larger in elongation as compared with the second membrane made of the ethylenevinyl alcohol copolymer. For this reason, if the first membrane 12 is formed of a single layer, the relatively large shearing forces acting on the adhered surfaces of the first and second membrane 12 and 13 due to the repeated deformation of the bladder 2 would ultimately cause the adhered surfaces of the first and second membranes to delaminate. However, since the first membrane 12 is formed by laminating a plurality of thin films, deformation in a shearing direction in a boundary region of the films is acceptable. As a consequence, it is possible to prevent relatively large shearing forces from acting on the adhered surfaces of the first and second membranes 12 and 13, thereby ensuring that any peeling-off or delamination of the adhered surfaces can be avoided and thus the gas-permeation resistance maintained for a long period of time.

Furthermore, since the elongation of the second membrane 13 is not so small that cracks are produced in the second membrane 13 itself, but is slightly smaller than that of the first membrane 12, the second membrane 13 functions to reinforce the first membrane 12 and thereby contributes to an improved rigidity.

Yet further, since the elongation of the entire impervious member 14 comprised of the first and second membrane 12 and 13 is relatively large, the bladder 2 can be also displaced over a relatively large range. Such a relatively large displacement ensures that the amount of volume of the liquid chamber 4 as expanded and contracted can be increased so as to provide an increase in accumulating capacity for the accumulator A.

Figure 4:
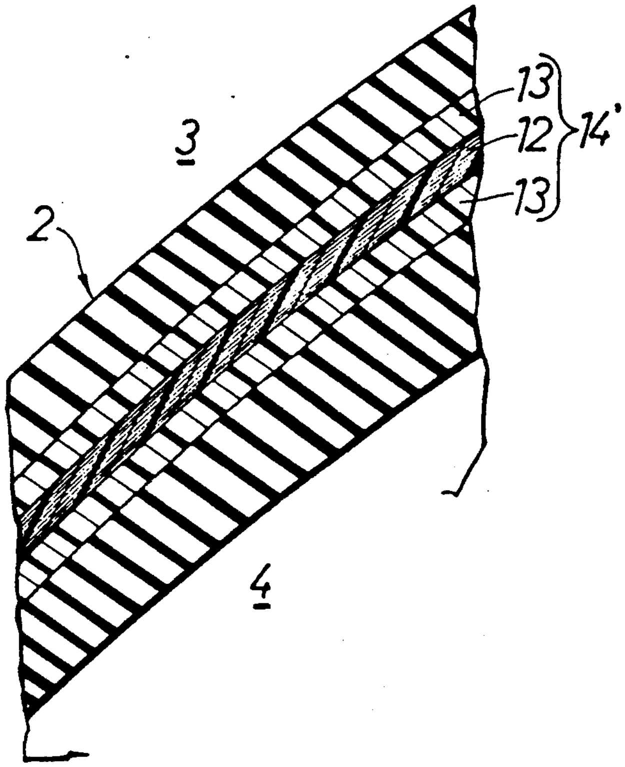
FIG. 4 is a sectional view similar to FIG. 2, but illustrating another embodiment of an accumulator according to the present invention.

Although the second membrane 13 was only affixed to the surface of the first membrane 12 which is closer or adjacent to the liquid chamber 4 so as to form the gas-impervious member 14 in the above-described embodiment, it should be understood that two second membranes 13 and 13, may be affixed to opposite surfaces of the first membrane 12 respectively to form a gas-impervious member 14' as is shown in FIG. 4. In doing so, it is possible to provide additional improved rigidity and to make it difficult to distinguish the face and back of the gas-impervious member 14' during the manufacture of the bladder 2 (i.e., to make the gas-impervious member 14' reversible), which is advantageous in the manufacturing process. In addition, although the gas-impervious members 14 and 14' have been shown as being embedded in the bladder body 15, the members may be affixed to either one of surfaces of the bladder body.

The results of a test carried out for the bladder fabrication by the present inventors will be described below.

A thin film having a thickness of 95 μm was formed from a polyvinyl alcohol containing 40% glycerine. Fourteen such thin films were laminated one on another to form a first membrane having a thickness of about 1,300 μm. Then, a second membrane made from an ethylene-vinyl alcohol copolymer of a thickness of about 25 μm was affixed to each of the opposite sides of the first membrane and preformed into a shape corresponding to the shape of an intended bladder so as to form a gas-impervious member. Thereafter, butyl rubber was preformed into a shape corresponding to the shape of the intended bladder and laminated by affixing the rubber to each of the opposite sides of the gas-impervious member and subjecting the laminate to vulcanization, thereby forming a bladder having a thickness of 2.7 mm.

This bladder was mounted into a shell, and $N_2$ gas was sealingly charged into the gas chamber at ambient temperature and at 130 kg f/cm$^2$. In a cyclic test, the liquid pressure in the liquid chamber was repeatedly varied 300,000 times in a range of 190 to 230 kg f/cm$^2$ at ambient temperature.

Before and after this cyclic test, a gas permeation test was carried out under a liquid pressure of 230 kg f/cm$^2$ and at a temperature of 80° C. for 12 hours. The results of these gas permeation tests showed that the amount of gas permeated was about 1/15 of that in the case of the bladder comprised of the single layer of butyl rubber and did not vary before and after the cyclic test.

What is claimed is:

1. An accumulator comprising a shell having spherical inner surfaces and a bladder dividing the interior of the shell into a gas chamber and a liquid chamber for accumulating a working liquid therein, a peripheral edge of the bladder being attached to the shell, the radius of curvature of an inner surface of said shell defining the gas chamber being larger than the radius of curvature of an inner surface of the shell defining the liquid chamber, said bladder including a bladder body of an elastic material, and a gas-impervious member laminated on the bladder body, the gas-impervious member being of a material having a smaller elongation than the elongation of said elastic material of the bladder body and comprising a first membrane of polyvinyl alcohol which contains glycerine, and a second membrane of ethylene-vinyl alcohol copolymer laminated on a surface of said first membrane which is adjacent to the liquid chamber.

2. An accumulator according to claim 1 including two second membranes which are laminated on both opposed surfaces of said first membrane.

3. An accumulator according to claim 1, wherein said first membrane is a lamination of a plurality of thin films.

4. An accumulator according to claim 1, further including a support member within the shell and having a cylindrical portion opened towards the liquid chamber and wherein the peripheral edge of the bladder is clamped between the shell inner surface defining the liquid chamber and the cylindrical portion of the support member.

5. An accumulator according to claim 4, wherein said bladder has a shape such that substantially no deflection occurs when the bladder is displaced to the maximum toward the gas chamber.

6. An accumulator according to claim 4, wherein said bladder has a surface area substantially equal to the inner surface defining the liquid chamber.

7. An accumulator comprising a shell and a bladder, the bladder having a peripheral edge attached to the shell and dividing the interior of the shell into a liquid chamber for accumulating a working liquid and a gas chamber, said bladder comprising a bladder body of an elastic material, the peripheral edge of the bladder body being supported on the shell, and a gas-impervious member including a lamination of a second membrane of an ethylene-vinyl alcohol copolymer to a surface of a first membrane of a polyvinyl alcohol which contains glycerine, the surface of the first membrane being adjacent to the liquid chamber, at least a peripheral edge of the gas-impervious member being supported on the shell together with said bladder body.

8. An accumulator comprising a shell and a bladder, the bladder having a peripheral edge attached to the shell and dividing the interior of the shell into a liquid chamber and a gas chamber, said bladder comprising a bladder body of an elastic material and a gas-impervious member including a first membrane comprising a laminate of a plurality of thin films of a material having a low gas-permeability, and a second membrane of a material having a smaller elongation than the elongation of the first membrane, the second membrane being laminated on at least one surface of the first membrane.

9. An accumulator according to claim 8, wherein said liquid chamber is for accumulating a working liquid, and said first membrane is of a polyvinyl alcohol which contains glycerine, and said second membrane is of an ethylenevinyl alcohol copolymer, said one surface of said first membrane being adjacent to the liquid chamber.

10. An accumulator comprising a shell and a bladder, the bladder having a peripheral edge attached to the shell and dividing the interior of the shell into a liquid chamber for accumulating a working liquid and a gas chamber, said bladder comprising a bladder body of an elastic material, the peripheral edge of the bladder body being supported on the shell, and a gas-impervious member including a lamination of a second membrane of an ethylene-vinyl alcohol copolymer to one surface of a first membrane of a polyvinyl alcohol which contains glycerine, said one surface being adjacent to the liquid chamber.

11. An accumulator according to claim 10, including two second membranes which are laminated on opposite surface of said first membrane.

12. An accumulator according to claim 10 further including a support member within the shell and having a cylindrical portion opened towards the liquid chamber and wherein the peripheral edge of the bladder is clamped between the shell inner surface defining the liquid chamber and the cylindrical portion of the support member.

13. An accumulator according to claim 12, wherein said bladder has a shape such that substantially no deflection occurs when the bladder is displaced to the maximum toward the gas chamber.

14. An accumulator according to claim 12, wherein said bladder has a surface area substantially equal to the inner surface defining the liquid chamber.

15. An accumulator according to claim 13, wherein said bladder is a vulcanized laminate of the bladder body and the gas-impervious member, said bladder body and said gas-impervious member are pre-shaped individually.

* * * * *